(12) United States Patent
Ko et al.

(10) Patent No.: US 10,137,577 B2
(45) Date of Patent: Nov. 27, 2018

(54) CABLE-DRIVEN PARARELL ROBOT CAPABLE OF CHANGING WORKSPACE

(71) Applicant: INDUSTRY FOUNDATION OF CHONNAM NATIONAL UNIVERSITY, Gwangju (KR)

(72) Inventors: Seong Young Ko, Gwangju (KR); Jong-Oh Park, Goyang-si (KR); Suk-Ho Park, Gwangju (KR); Jin Woo Jung, Gwangju (KR); Jeong An Seon, Gwangju (KR)

(73) Assignee: Industry Foundation of Chonnam National University, Gwangju (KR)

( * ) Notice: Subject to any disclaimer, the term of this patent is extended or adjusted under 35 U.S.C. 154(b) by 49 days.

(21) Appl. No.: 15/394,562

(22) Filed: Dec. 29, 2016

(65) Prior Publication Data
US 2018/0009115 A1    Jan. 11, 2018

(30) Foreign Application Priority Data
Jul. 5, 2016    (KR) ........................ 10-2016-0084940

(51) Int. Cl.
*B25J 15/00*    (2006.01)
*B25J 9/00*    (2006.01)
*B25J 17/02*    (2006.01)

(52) U.S. Cl.
CPC ......... *B25J 15/0061* (2013.01); *B25J 9/0078* (2013.01); *B25J 17/0266* (2013.01); *G05B 2219/40267* (2013.01); *G05B 2219/40304* (2013.01)

(58) Field of Classification Search
CPC ......... B25J 9/0078; G05B 2219/40267; G05B 2219/40304
USPC ......................................................... 212/274
See application file for complete search history.

(56) References Cited

U.S. PATENT DOCUMENTS
2017/0282378 A1\* 10/2017 Suzuki ................ B25J 15/0491

FOREIGN PATENT DOCUMENTS
FR         2910833 A1 \*  7/2008 .......... B25J 17/0266
KR    10-1421351 B1      7/2014
KR    10-2015-0134647 A  12/2015

\* cited by examiner

*Primary Examiner* — Ronald P Jarrett
(74) *Attorney, Agent, or Firm* — Rabin & Berdo, P.C.

(57) ABSTRACT

Disclosed is a cable-driven parallel robot capable of changing a workspace, in which the cable-driven parallel robot is provided with an end effector having a plurality of modules that can efficiently move to upper and side parts of an object without interference. Module-direction changing standby stations are provided on each of opposing sides of an upper frame such that the modules of the end effector are coupled to the module-direction changing standby station for direction change standby, so that the modules can efficiently move to upper and side parts of the workspace without interference, thereby maximizing work efficiency. To this end, there is provided a cable-driven parallel robot including: an installation frame, and upper and side frames; a plurality of driving units; a plurality of cables; the module-direction changing standby station; and an end effector provided with a plurality of modules.

14 Claims, 6 Drawing Sheets

CABLE-DRIVEN PARARELL ROBOT CAPABLE OF CHANGING WORKSPACE

BACKGROUND OF THE INVENTION

Field of the Invention

The present invention relates generally to a cable-driven parallel robot capable of changing a workspace. More particularly, the present invention relates to a cable-driven parallel robot capable of changing a workspace, in which the cable-driven parallel robot is provided with an end effector having a plurality of modules that can efficiently move to upper and side parts of an object without interference.

Description of the Related Art

Up to now, many robots used in applied fields of industrial robots have been developed.

Generally, a widely-known serial robot has a structure in which joints and links are alternately connected to each other in series, and can realize a large workspace, various working positions, and multi-postures. However, a payload of the serial robot is low and the workspace thereof is limited to its arm length.

To the contrary, a parallel multi-joint robot in which joints, links, and support parts are configured to have a parallel structure can perform work with high precision, high speed, and high payload capacity in a relatively small workspace.

Such a parallel robot is a robot, in which a platform corresponding to an end effector of a robot manipulator and a base fixed to a foundation are connected to each other by multiple links including a linear or rotational drive device so as to have a closed-loop structure.

Meanwhile, the serial robot as mentioned above has an advantage in that it has links serially connected to each other, and a large workspace in which an end effector can operate. However, the serial robot has a limitation in that it is susceptible to structural changes due to bending at the links and joints, whereby it may have low precision. Furthermore, the payload of the serial robot is very limited compared to weight of the serial robot itself.

However, although the parallel robot has a workspace smaller than the serial robot, it can solve problems of the serial robot mentioned above, and greatly increase work precision. Accordingly, use of the parallel robot is gradually on the rise.

In this case, a cable-driven parallel robot that can simultaneously solve the problem of the parallel robot in ensuring a workspace, and the problem of the serial robot in securing sufficient payload has been developed.

The cable-driven parallel robot (CDPR) is a device capable of performing various work tasks by changing the position of the end effector by winding or unwinding cables. As shown in FIG. 1, the cable-driven parallel robot is provided with frames 10 having a plurality of connecting points, and an end effector 30 whose position is changed by winding or unwinding each of cables 20.

The cable-driven parallel robot having the above-mentioned configuration can efficiently control the position of the end effector 30 in a limited space, and when each of the connecting points of the frames 10 is installed in a widely distributed way, a usable workspace may become large, thereby increasing workspace efficiency.

However, as shown in FIG. 2, when the cable-driven parallel robot is configured to have a shape of a complete enclosed space, a portion of an object or neighboring structures in a workspace interfere with an end effector of the parallel robot, which impedes the range of the end effector, thereby reducing the workspace.

For example, when cleaning an upper surface of a roof of a large-sized bus, upper end corners of left and right sides of the bus may interfere with lower cables of a cable-driven parallel robot having eight cables, thereby making access to the upper surface of the roof difficult.

Of course, to avoid such interferences, a cable-driven parallel robot may be provided on each side frame. However, this solution increases cost, and reduces efficiency due to structural problems.

The foregoing is intended merely to aid in the understanding of the background of the present invention, and is not intended to mean that the present invention falls within the purview of the related art that is already known to those skilled in the art.

DOCUMENTS OF RELATED ART (Patent Document 1) Korean Patent No. 10-1421351
(Patent Document 2) Korean Patent Application Publication No. 10-2015-0134647

SUMMARY OF THE INVENTION

Accordingly, the present invention has been made keeping in mind the above problems occurring in the related art, and the present invention is intended to propose a cable-driven parallel robot capable of changing a workspace, in which the cable-driven parallel robot allows an end effector connected to cables to have a plurality of modules, thereby efficiently changing the position of each of coupled modules without interference, and maximizing efficiency of the cable-driven parallel robot by reorganizing the workspace into shapes of an incomplete enclosed plane, a complete enclosed plane, an incomplete enclosed space, and a complete enclosed space.

In order to achieve the above object, according to one aspect of the present invention, there is provided a cable-driven parallel robot capable of changing a workspace, the cable-driven parallel robot including: an installation frame having an upper frame defining an upper workspace, and side frames defining side workspaces; a plurality of driving units respectively provided on respective sides of the installation frame, each of the driving units generating forward and reverse rotational power; a plurality of cables installed through the driving units, each of the cables being wound or unwound by the power of its associated driving unit; module-direction changing standby stations provided on sides of the installation frame; and an end effector provided with a plurality of modules connected to the respective cables of the driving units, the modules being capable of performing work and moving in the upper workspace or in the side workspaces via length adjustment of the associated cables, with a coupling means provided in the modules to couple or decouple the modules to or from each other, wherein the end effector moves to the upper workspace and the side workspaces with the modules being coupled to or decoupled from each other in the module-direction changing standby stations.

In this case, it is preferred that the module-direction changing standby station may include a stop protrusion, and each of the modules of the end effector may include a latch removably fastened to the module-direction changing standby station.

In addition, it is preferred that each of the modules constituting the end effector may include: an upper module, to which a pair of cables of the driving units provided on both ends of an upper part of the installation frame are connected, and a lower module, to which a pair of cables of the driving units provided on both ends of a lower part of the installation frame are connected.

In this case, it is preferred that the upper module may be provided with the latch to be fastened to the stop protrusion of the module-direction changing standby station.

Furthermore, it is preferred that the driving units may be provided at respective corners of upper and lower parts of the installation frame.

Additionally, it is preferred that the coupling means may be a permanent magnet, an electromagnet, or a mechanical coupling means.

The cable-driven parallel robot capable of changing a workspace according to the present invention has the following effects.

First, the cable-driven parallel robot is provided with the end effector having a plurality of modules, and by being coupled to or decoupled from each other via the module-direction changing standby station, some of the modules can efficiently move to upper and side parts of an object without the work object or neighboring structures interfering with the modules, thereby maximizing workability and space efficiency.

That is, since the modules of the end effector to which a work module is mounted can gradually move along side and upper parts of an object arranged in a space of an installation frame, it is possible to realize continuity of work, thereby reducing working hours, and increasing workspace efficiency.

Second, apart from work on a particular object, the cable-driven parallel robot can efficiently perform transporting work via length adjustment of the cables.

That is, the cable-driven parallel robot allows a transporting means to be provided via coupling or decoupling of modules of the end effector, and can transport objects by changing positions of the modules of the end effector via length adjustment of the cables performed by operation of the driving unit.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Terms or words used in this specification and the accompanying claims should not be construed to be limited to meanings that are normal or used in dictionaries, but should be construed as meanings and concepts in line with the scope and spirit of the present invention on the basis of the principle that an inventor can properly define concepts of the terms to describe an embodiment of the present invention in a best mode.

Hereinbelow, referring to FIGS. 3 to 8, a cable-driven parallel robot capable of changing a workspace will be described in detail according to an exemplary embodiment of the present invention.

The cable-driven parallel robot capable of changing a workspace includes an end effector 500 to which a work module (not shown) is mounted. The end effector is configured to have a plurality of modules, and enables the plurality of modules to move along a direction of a circumference of an object by the modules being coupled to or decoupled from each other.

Accordingly, it is possible to maximize workspace efficiency and to realize continuity of work, thereby reducing working hours and increasing productivity of work.

Figure 1:
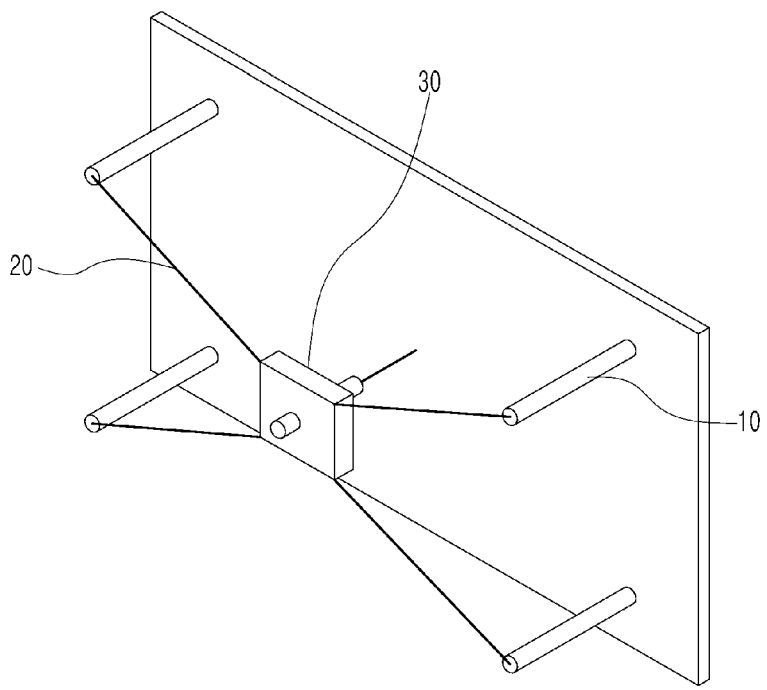
FIGS. 1 and 2 are perspective views of a cable-driven parallel robot according to the related art.
Figure 2:
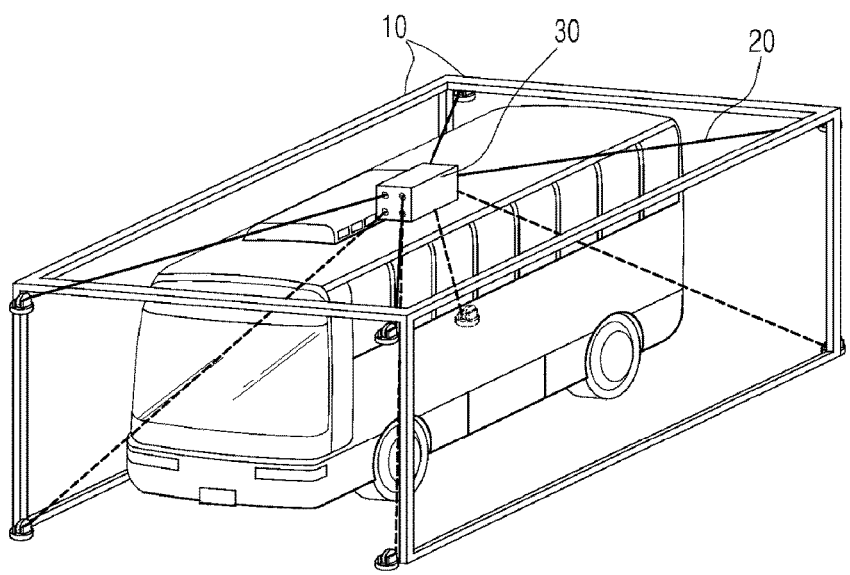
Figure 3:
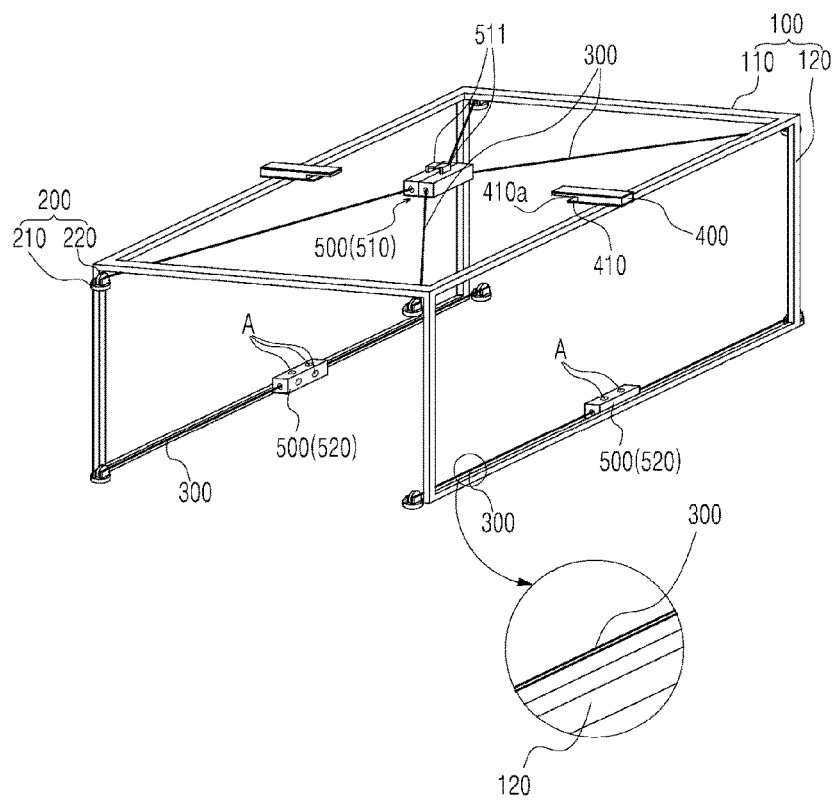
FIG. 3 is a perspective view of a cable-driven parallel robot capable of changing a workspace according to an exemplary embodiment of the present invention.

As shown in FIG. 3, the cable-driven parallel robot capable of changing a workspace includes an installation frame 100, driving units 200, cables 300, module-direction changing standby stations 400, and the end effector 500.

The installation frame 100 defines the workspace.

In this case, the installation frame 100 is not limited to a specific configuration, and a structure provided such that respective components constituting a cable-driven parallel robot can be mounted may take the place of the installation frame 100.

In the specification, as an example for convenience of description, the installation frame 100 includes an upper frame 110 and side frames 120, and may be replaced with outer walls and inner walls of a building.

The upper frame 110 provides an upper workspace, and as shown in FIG. 3, the installation frame 100 may include a rectangular frame on an upper part thereof.

In this case, though not shown, the work module includes equipment for performing a specific work task on an object arranged in the workspace of the installation frame 100, for example, equipment for welding, painting, measuring, and cleaning, and is removably provided on the end effector 500.

The present invention is about a cable-driven parallel robot to which the work module is mounted, and detailed descriptions concerning the work module and processes in which the work module and the end effector 500 are coupled to each other will be omitted.

In addition, each of the side frames 120 provides a side workspace of the work module, and constitutes both sides of the installation frame 100.

The side frames 120 are provided to perpendicularly extend downward from both end parts of the upper frame 110.

Next, each of the driving units 200 generates power for winding or unwinding each of the cables 300, and is provided on each side of the installation frame 100.

In this case, it is preferred that the driving unit 200 is provided on each of a pair of opposing sides of the installation frame 100, and preferably, the driving unit 200 is provided on an end of each of the sides.

As shown in FIG. 3, it is preferred that the driving unit 200 is provided at each corner of the installation frame 100.

Accordingly, since a pair of driving units 200 is provided on both ends of each of the sides, the driving units 200 pull or release both ends of each of the modules constituting the end effector 500, thereby adjusting the position of the end effector 500.

The driving unit 200 includes a motor 210 for generating forward and reverse rotational power, and a drum 220 which the cable 300 is wound on or unwound from.

Although it is preferred that a winch is provided as the driving unit 200, the driving unit 200 is not limited to the winch. That is, the driving unit 200 may be any well-known devices that generate power capable of winding or unwinding the cable 300.

Next, the cable 300 is wound on the drum 220 of the driving unit 200 or is unwound from the drum 220, thereby adjusting the position of the end effector 500.

The cable 300 is installed through each of the driving units 200, and in the specification, 8 cables are installed through the driving units 200.

Next, when some of the modules of the end effector 500 move on the installation frame 100, the module-direction changing standby stations 400 allow some of the modules to temporarily stay on the upper frame 110 so as to change moving directions of some of the modules, and are provided on routes on which the modules move.

In this case, when considering the route on which the modules move from a side frame through an upper frame to the other side frame, as shown in FIG. 3, each of the module-direction changing standby stations 400 is preferred to be provided on the opposing sides of the upper frame 110.

That is, the module-direction changing standby station 400 is configured such that the module is removably coupled to the module-direction changing standby station right before the module of the end effector 500 changes its direction so as to change a moving direction of the module of the end effector 500 to which the work module is mounted.

The module-direction changing standby stations 400 are provided to be opposed to each other on the upper frame 110, and each of the module-direction changing standby stations 400 includes a stop protrusion 410 defining holding groove 410a.

In this case, the stop protrusion 410 is a part to which the module of the end effector 500 is coupled, and preferably, the stop protrusion 410 is configured to have a short side compared to an upper surface of the module-direction changing standby station 400.

Next, the end effector 500 is a medium for changing the position of the work module while moving in the workspace of the installation frame 100, and is configured to have the plurality of modules that are separate.

As the end effector 500 is configured to have the plurality of modules that are separate, each of the modules is coupled to or decoupled from each other in various ways, thereby enabling the position change of the module.

In this case, each of the modules constituting the end effector 500 is provided with the cables 300 connected to both ends thereof.

That is, the cables 300 connected to the both ends of each of the modules of the end effector 500 are pulled or released, which enables position adjustment of each of the modules.

Figure 4:
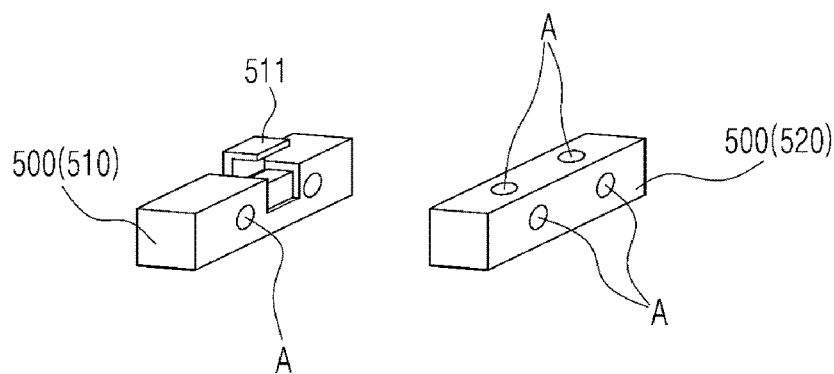
FIG. 4 shows perspective views of modules constituting an end effector of the cable-driven parallel robot according to the exemplary embodiment of the present invention.

As shown in FIG. 4, the end effector 500 includes upper modules 510 and lower modules 520.

The upper module 510 crosses the upper workspace of the upper frame 110, or lifts or lowers in the side workspace of each of the side frames 120 via power of the driving unit 200.

Preferably, the upper module 510 is configured to have a hexahedral shape, and includes a coupling means A so as to be coupled to or decoupled from neighboring upper module 510 and lower module 520.

The coupling means A is mounted to each of side surfaces and a lower surface of the upper module 510, and is not limited to a specific configuration.

Whatever enables each of the modules to be coupled to or decoupled from each other may be used as the coupling means A. For example, a permanent magnet, an electromagnet, or a mechanical coupling means may be used as the coupling means A.

The upper module 510 is provided with a latch 511 thereon.

The latch 511 is configured to couple the upper module 510 to the module-direction changing standby station 400 by being fastened to the stop protrusion 410 of each of the module-direction changing standby stations 400, and the latch 511 is rotatably shaft-coupled to an upper part of the upper module 510.

Figure 5A:
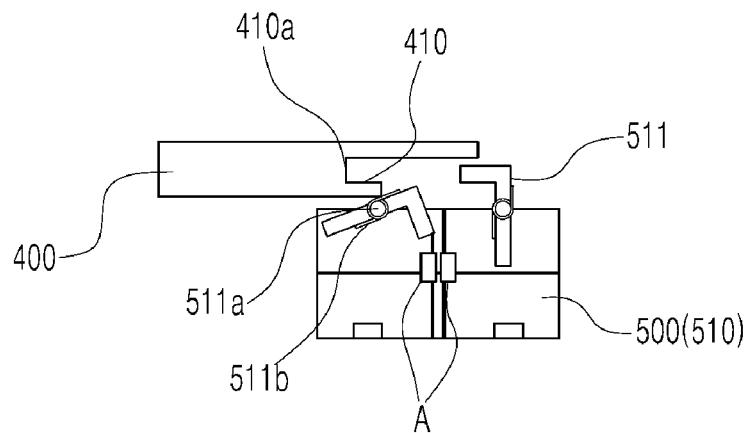
FIGS. 5A and 5B are side views showing processes in which upper modules of the end effector are coupled to a module-direction changing standby station of the cable-driven parallel robot according to the exemplary embodiment of the present invention.
Figure 5B:
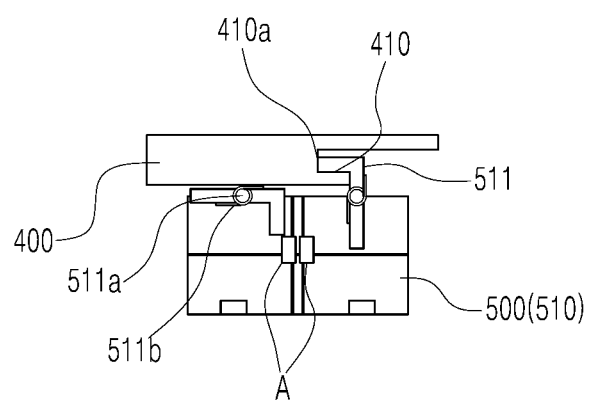

As shown in FIGS. 5A and 5B, preferably, latches 511 are formed by being perpendicularly bent, and bent directions of the latches 511 that are opposed to each other are opposed to each other.

In this case, it is preferred that each of the latches 511 is provided with a restoring spring 511b on a rotational shaft 511a thereof such that the position of the latch 511 can be restored.

That is, according to the above-mentioned configuration, as shown in FIG. 5A, when a pair of upper modules 510 coupled to each other are coupled to the module-direction changing standby station 400 of a first side of the upper frame, the latch 511 of a first side of the upper modules 510 is rotated by interference with the stop protrusion 410, and as shown in FIG. 5B, the latch 511 of a second side of the upper modules 510 is fastened to the stop protrusion 410, so that each of the upper modules 510 can be coupled to the module-direction changing standby station 400.

In addition, the lower module 520 moves along sides of the side frames 120 via power of the driving unit 200, or is coupled to the upper module 510, and lifts or lowers in the side workspace of the side frames 120.

It is preferred that the lower module 520 is configured to have a hexahedral shape, and includes the coupling means A so as to be coupled to or decoupled from the upper module 510.

The coupling means A is mounted to each of upper and side surfaces of the lower module 520, and is configured so as to be coupled to or decoupled from the coupling means of the upper module 510.

Hereinbelow, detailed descriptions will be made concerning operation of the cable-driven parallel robot capable of changing a workspace having the above-mentioned configuration.

In the specification, a bus is presented as an example of an object to aid in the understanding of the descriptions.

FIG. 3 shows an initial state in which each of components of the cable-driven parallel robot capable of changing a workspace is positioned. The pair of the upper modules 510 is positioned in the upper workspace while coupled to each other by the coupling means A, and each of a pair of lower modules 520 is positioned on respective lower parts of the side frames 120.

In this case, though not shown, the upper module 510 is provided with the work module on a first side thereof.

In this state, a workspace of the installation frame 100 is obtained, and a bus is positioned in the workspace.

Next, work on an upper part of the bus is performed using the work module (not shown) mounted to the upper module 510.

After that, when the work on the upper part of the bus is completed, work on a side part of the bus is performed.

To this end, the upper module 510 is moved to a side of the first side of the upper frame 110 via operation of the driving unit 200 mounted to the upper frame 110.

In this case, it is to be appreciated that the upper module 510 can be moved by the cables 300 being wound on or unwound from the drum 220 of the driving unit 200.

Meanwhile, after the upper module 510 moves toward the module-direction changing standby station 400 provided on the side of the first side of the upper frame 110, the upper module 510 is coupled to the module-direction changing standby station 400 such that a moving direction of the upper module 510 can be changed toward the side frame 120.

In this case, as shown in FIG. 5A, the latch 511 of the first side of the upper modules 510 is rotated by interference with the stop protrusion 410 of the module-direction changing standby station 400, and as shown in FIG. 5B, the latch 511 of the second side of the upper modules 510 is fastened to the holding groove 410a of the module-direction changing standby station 400.

Next, the pair of upper modules 510 coupled to each other is separated.

To this end, after decoupling the coupling means A from the upper module 510, the upper module 510 is lowered toward the lower part of the side frame 120 by unwinding the cable 300 of the driving unit 200.

In this case, the coupling means A may be decoupled by a worker, or in the case of the electromagnet, the coupling means A may be decoupled via electric current control.

Figure 6A:
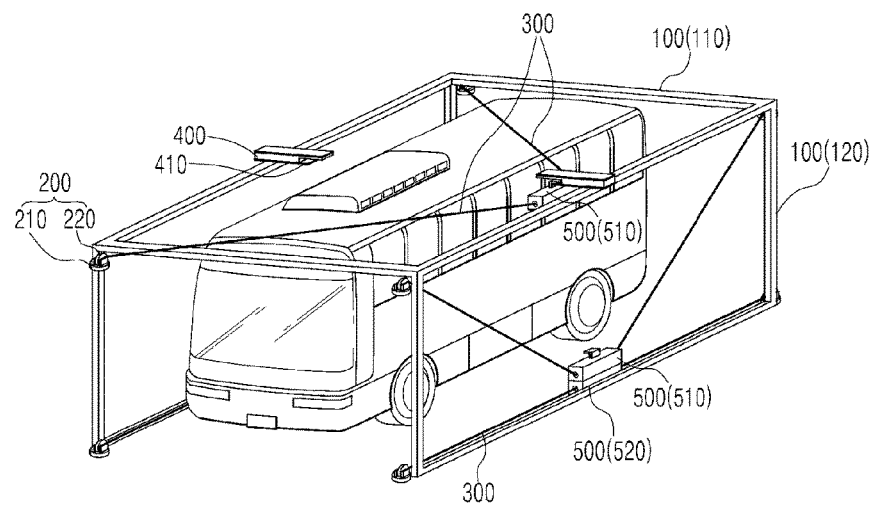
FIGS. 6A and 6B are perspective views showing operation states of the end effector of the cable-driven parallel robot according to the exemplary embodiment of the present invention.

After that, as shown in FIG. 6A, the upper module 510 lowers, and is coupled to the lower module 520 positioned on the lower part of the side frame 120.

In this case, the upper module 510 and the lower module 520 are coupled to each other by the coupling means A.

Figure 6B:
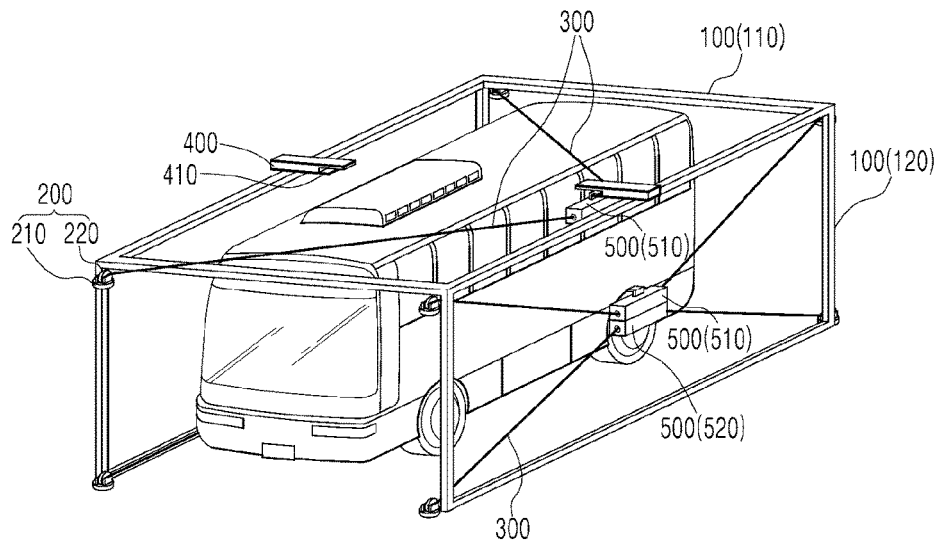

Next, length adjustment of the cable 300 is performed by operating the driving units 200 provided on an upper part and the lower part of the side frame 120. As shown in FIG. 6B, the upper module 510 and the lower module 520 are lifted or lowered by the length adjustment of the cable 300, and thus work on the side part of a bus is performed.

After that, when the work on the side part of a first side of the bus is completed, the series of processes mentioned above are performed in reverse order. Accordingly, the upper module 510 is moved to the side frame 120 of a second side of the bus.

In this case, detailed descriptions will be omitted about processes in which the upper module 510 moves toward the side frame 120 of the second side of the bus via the module-direction changing standby station 400 on the upper frame 110 since the processes are the same as the processes mentioned above.

After that, while coupled to each other, the upper module 510 and the lower module 520 lift or lower on the side frame 120 of the second side of the bus, so that work on the side part of the second side of the bus is performed.

Through such a series of processes, work using the cable-driven parallel robot capable of changing a workspace is completed.

Meanwhile, except for the above-mentioned work, the cable-driven parallel robot capable of changing a workspace according to the present invention may be used in a transporting work.

Figure 7:
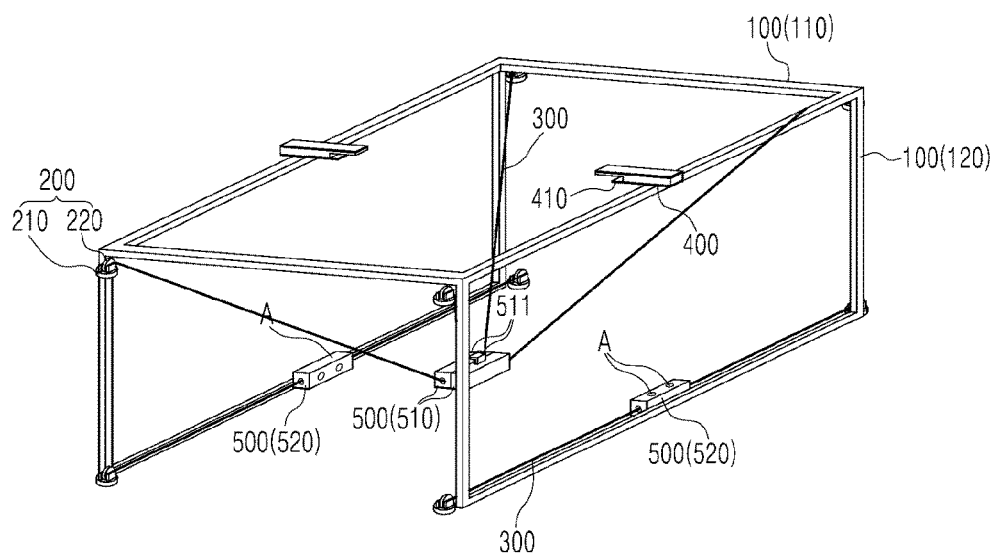
FIGS. 7 and 8 are perspective views showing operations of transporting work performed via coupling or decoupling of the modules constituting the end effector of the cable-driven parallel robot according to the exemplary embodiment of the present invention.

That is, the installation frame 100 is positioned on a transportation route of an object, and as shown in FIG. 7, an object (not shown) is hung on the upper module 510 and lifted, or an object is moved in a longitudinal direction of the upper frame 110 by the operation of the driving unit 200 of the upper frame 110, and thereby transporting work of an object can be performed.

Figure 8:
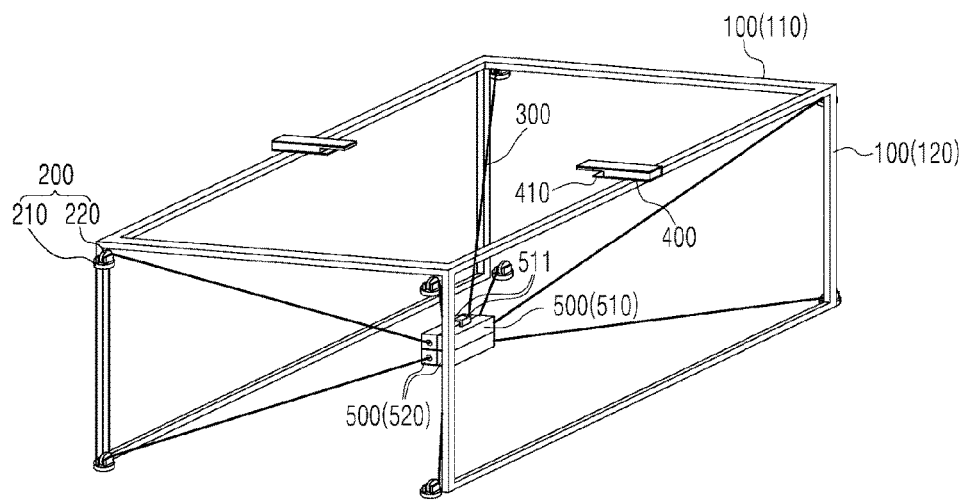

In this case, as shown in FIG. 8, when the upper module 510 and the lower module 520 coupled to each other are applied to the transporting work, it is possible to more precisely perform transportation and position adjustment of an object.

That is, since the cables 300 are connected to the end effector 500 in eight directions thereof and an object is mounted to the end effector 500, it is possible to increase precision of the transporting work without the object being biased to any one side.

As described above, the cable-driven parallel robot capable of changing a workspace according to the present invention includes the end effector 500 configured to have the plurality of modules, and is provided with the module-direction changing standby station 400 on the upper frame, whereby the cable-driven parallel robot allows the plurality of modules of the end effector 500 to be coupled to or decoupled from each other via the module-direction changing standby station 400.

Accordingly, the end effector 500 having the plurality of modules can efficiently move without interference on the upper part and side part of the installation frame via coupling or decoupling of the modules, thereby increasing efficiency of operation, reducing working hours, and maximizing productivity.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A cable-driven parallel robot capable of changing a workspace, the cable-driven parallel robot comprising:
    an installation frame having
        an upper frame defining an upper workspace, and
        side frames defining side workspaces;
    a plurality of driving units respectively provided on respective sides of the installation frame, each of the driving units generating forward and reverse rotational power;
    a plurality of cables installed through the driving units, each of the cables being wound or unwound by the power of its associated driving unit;
    a plurality of end effectors separated from each other and configured to separably couple to one another by a coupling means, wherein each of the end effectors is connected to two cables of the plurality of cables; and
    module-direction changing standby stations provided on sides of the upper frame, wherein each of the module-direction changing standby stations is provided at a middle portion of the sides of the upper frame.

2. The cable-driven parallel robot of claim 1, wherein said each of the module-direction changing standby stations includes a stop protrusion, and said each of the end effectors includes a latch configured to be fastened to the stop protrusion of the module-direction changing standby stations.

3. The cable-driven parallel robot of claim 2, wherein the plurality of end effectors comprises:
   upper end effectors to which the cables provided on both ends of the upper frame, are connected, and
   lower end effectors to which the cables provided on the side frames, are connected.

4. The cable-driven parallel robot of claim 2, wherein the coupling means is a permanent magnet or an electromagnet.

5. The cable-driven parallel robot of claim 1, wherein the plurality of end effectors comprises:
   upper end effectors to which the cables provided on both ends of the upper frame, are connected, and
   lower end effectors to which the cables provided on the side frames, are connected.

6. The cable-driven parallel robot of claim 5, wherein each of the upper end effectors is provided with a latch configured to be fastened to a stop protrusion of the module-direction changing standby stations.

7. The cable-driven parallel robot of claim 5, wherein each of the upper end effectors is provided with a latch configured to be fastened to a stop protrusion of the module-direction changing standby stations.

8. The cable-driven parallel robot of claim 1, wherein the coupling means is a permanent magnet or an electromagnet.

9. A cable-driven parallel robot capable of changing a workspace, the cable-driven parallel robot comprising:
   a first frame and a second frame defining an upper workspace, wherein each of the first and second frames are provided at a predetermined height with a predetermined length;
   a first pair of driving units provided at both sides of the first frame, and a second pair of driving units provided at both sides of the second frame, the first and second pairs of driving units generating forward and reverse rotational power;
   a first pair of cables wound or unwound by the first pair of driving units, and a second pair of cables wound or unwound by the second pair of driving units;
   a first end effector connected to the first pair of cables, and a second end effector connected to the second pair of cables, wherein the first end effector and the second end effector are separated from each other and configured to separably couple to each other by a coupling means; and
   a first module-direction changing standby station installed at a middle portion of the first frame, and a second module-direction changing standby station installed at a middle portion of the second frame,
   wherein said each of the first and second end effectors includes a latch, and each of the first and second module-direction changing standby stations includes a stop protrusion to which the latch is configured to be fastened.

10. The cable-driven parallel robot of claim 9, wherein the latch has an reversed L-shape and is rotatably installed at an upper portion of said each of the first and second end effectors, and
   said each of the first and second module-direction changing standby stations further includes a holding groove to which a bent portion of the latch is coupled.

11. The cable-driven parallel robot of claim 9, wherein the coupling means is a permanent magnet or an electromagnet.

12. The cable-driven parallel robot of claim 9, further comprising:
   a third frame disposed below the first frame, and a fourth frame disposed below the second frame;
   a third pair of driving units provided at both sides of the third frame, and a forth pair of driving units provided at both sides of the fourth frame, the third and fourth driving units generating forward and reverse rotational power;
   a third pair of cables wound or unwound by the third pair of driving units, and a fourth pair of cables wound or unwound by the fourth pair of driving units; and
   a third end effector connected to the third pair of cables, and a fourth end effector connected to the fourth pair of cables, wherein the third end effector is separated from other effectors and configured to separably couple to the first end effector by the coupling means, and the fourth end effector is separated from other effectors and configured to separably couple to the second end effector by the coupling means.

13. The cable-driven parallel robot of claim 12, further comprising:
   a seventh frame connecting a first end of the first frame and a first end of the third frame,
   an eighth frame connecting a second end of the first frame and a second end of the third frame,
   a ninth frame connecting a first end of the second frame and a first end of the fourth frame, and
   a tenth frame connecting a second end of the second frame and a second end of the fourth frame.

14. The cable-driven parallel robot of claim 9, further comprising:
   a fifth frame connecting a first end of the first frame and a first end of the second frame, and
   a sixth frame connecting a second end of the first frame and a second end of the second frame.

* * * * *